United States Patent [19]

Sze et al.

[11] 4,227,995

[45] Oct. 14, 1980

[54] DEMETALLIZATION OF HYDROCARBON FEEDSTOCK

[75] Inventors: Morgan C. Sze, Upper Montclair; Harvey D. Schindler, Fairlawn, both of N.J.

[73] Assignee: The Lummus Company, Bloomfield, N.J.

[21] Appl. No.: 966,901

[22] Filed: Dec. 6, 1978

[51] Int. Cl.$^2$ ............................................. C10G 23/00
[52] U.S. Cl. ................................................ 208/251 H
[58] Field of Search ................. 208/251 H, 251 R, 307

[56] References Cited

U.S. PATENT DOCUMENTS

| | | | |
|---|---|---|---|
| 2,987,470 | 6/1961 | Turken | 208/251 H |
| 3,530,066 | 9/1970 | Kuwata et al. | 208/251 H |
| 3,583,902 | 6/1971 | Masologites et al. | 208/251 H |
| 3,617,481 | 11/1971 | Voorhies, Jr. et al. | 208/251 H |

*Primary Examiner*—George Crasanakis
*Attorney, Agent, or Firm*—Louis E. Marn; Elliot M. Olstein

[57] ABSTRACT

A metal containing hydrocarbon feedstock, such as a heavy residue, is contacted with hydrogen and a material characterized by low porosity, less than 0.3 cc/gram; low surface area, less than 5 m$^2$/g; high average pore diameter, greater than 1,000 Angstroms; and a high distribution of large pores, at least 40%, and preferably 50 to 80% of pores greater than 10,000 Angstroms. A preferred material is coke.

21 Claims, 1 Drawing Figure

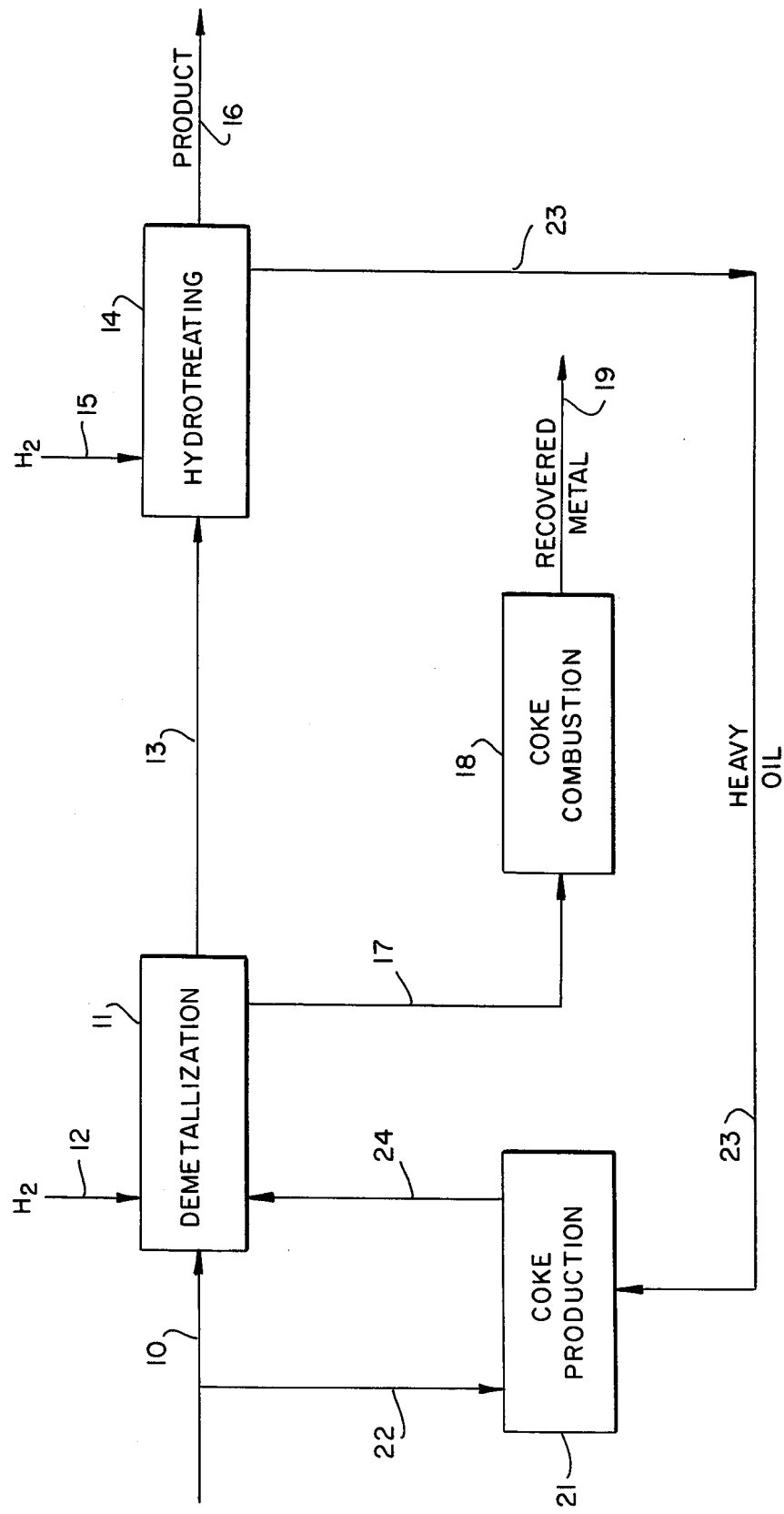

DEMETALLIZATION OF HYDROCARBON FEEDSTOCK

This invention relates to the treatment of hydrocarbon feedstocks, and more particularly to a new and improved process for effecting demetallization of a metal containing hydrocarbon feedstock.

Hydrocarbon feedstocks in particular, heavy crudes and resids, have a high concentration of metals, such as vanadium and nickel. In attempting to catalytically treat such hydrocarbon feedstocks; e.g., upgrading to produce lighter materials, the high metal content of such feedstocks limits the catalyst's life. Thus, for example, a heavy crude, such as Boscan, which has over 1,000 ppm vanadium plus nickel, would reduce the active life of a hydrotreating catalyst to less than one barrel per pound of catalyst as a result of metal deposition which inactivates the catalyst. Such metal deposition is irreversible so that catalyst regeneration is not possible.

As a result, in many cases, a hydrocarbon feedstock is subjected to a treatment to effect demetallization thereof prior to further catalytic treatment thereof. In general, such demetallization is effected by contacting the feedstock with hydrogen and a particulate material which is characterized by a high porosity, generally greater than 0.3 cc/gram; a high surface area; a low average pore diameter; and a high distribution of small pores. Such processes are disclosed, for example, in U.S. Pat. Nos. 3,716,479; 3,785,967; 3,803,027; 3,867,282; 3,891,541; and 3,898,155.

U.S. Pat. No. 3,947,347 discloses a process for removing metal contaminents with a material having a low surface area, 1 to 20 and preferably 2 to 10 meter square per gram; high average pore diameter, in a range of 1,000 to 10,000 A; and high porosity in excess of 0.5 cc/gram.

U.S. Pat. No. 3,617,481 discloses a hydrodementallization process wherein a recovered high metals containing fraction is coked to form a coke containing the metals. The coke is then treated to increase the surface area and porosity thereof and the treated metals containing coke is employed in the hydrodemetallization. The coke is disclosed as having a surface area in the order of 200-400 m²/g.

U.S. Pat. No. 2,987,470 discloses demetallization in an ebullated bed by the use of a particulate contact material. The patentee characterizes the material as any material capable of withstanding the operating conditions and discloses by way of example, bauxite, alumina, sand, coke, beryl, silicon carbide, magnesia and iron ore. The patent provides no information as to any required characteristics for the solid.

U.S. Pat. No. 3,891,541 discloses a hydrodemetalation-desulfurization catalyst which is a composite of a hydrogenating component and a refractory base, with the catalyst having not less than 65±10% of the pore volume with a diameter of 180–300 A and a surface area of 40–100 m²/g. The patent discloses as suitable supports, silica-alumina, silica-magnesia, activated carbon, charcoal, petroleum coke, and large pore aluminas or high alumina ores and clays.

Thus, in accordance with the general teachings in the art, demetallization is effected by the use of a material having a high porosity and/or high surface area.

In accordance with the present invention, applicant has found that metal contaminents can be removed from a hydrocarbon feedstock by use of a material having a low porosity, a low surface area, a high average pore diameter and a high percentage of large pores.

More particularly, the material employed for effecting demetallization in accordance with the present invention has a porosity of less than 0.3 cc/gram, most generally less than 0.2 cc/gram, and in most cases less than 0.1 cc/gram.

The material has a surface area of less than 5 meter square per gram, generally less than 3 meter square per gram and most generally less than 2 meter square per gram.

The material has an average pore diameter of greater than 1,000 °A., with the average pore diameter being defined as follows:

Average pore diameter in Angstroms = $\frac{4 \times \text{Pore Volume cc/g} \times 10,000}{\text{Surface area, m}^2/\text{g}}$ The material has a pore distribution in which at least 40%, and most generally 50 to 80% of the pores have a size greater than 10,000 A; at least 60%, preferably 70 to 80% of the pores are of a size greater than 1,000 A., and less than 20%, preferably less than 10% of the pores have a size of less than 100 A.

The material having such characteristics which is preferably employed in accordance with the present invention is a calcined coke and/or a green coke.

The hereinabove described materials are capable of effecting demetallization of a hydrocarbon feedstock without the use of any other components. In some cases, it may be desirable to employ a hydrogenating component which is one or more of a Group VIB or Group VIII metal, which is in sulfided form as a result of presulfiding or sulfiding, in situ. As examples of such components, there may be mentioned: $NiS$; $MoS_2$; $CoS$; $WS_2$; $NiS$. $MoS$; $CoS$. $MoS_2$; $NiS$. $WS_2$. Such components may be provided by impregnating the coke with a soluble compound of the metal (s); e.g., nickel nitrate, cobalt acetate, ammonium tungstate, etc., followed by drying, calcining and sulfiding.

The contacting of the hydrocarbon feedstock with hydrogen and the material employed in accordance with the present invention is effected at conditions which are generally known to be effective for effecting demetallization of a hydrocarbon feedstock. In general, such demetallization is effected at a temperature in the order of from about 500° F. to 1,000° F., preferably from about 700° F. to 850° F., and a pressure of from about 300 to 3,000 psig, preferably 750 to 2500 psig. The liquid hourly space velocity is generally in the range from 0.1 to 10, preferably from 0.3 to 1.5. The hydrogen is generally supplied in an amount sufficient to effect the demetallization, with such hydrogen generally being employed in an amount from 300 to 15,000 standard cubic feet per barrel, preferably from 500 to 3000 standard cubic feet per barrel. The selection of optimum conditions for demetallization of a particular feedstock is deemed to be within the scope of those skilled in the art from the teachings herein.

The feedstock which can be treated in accordance with the present invention may be any one of a wide variety of metal containing feedstocks, which are generally derived from either petroleum or coal sources. As representative examples of such feedstocks, there may be mentioned; heavy petroleum crudes, petroleum residues from atmospheric or vacuum distillations, shale oil, shale oil residues, tar sands, bitumen, coal tar pitches, solvent deasphalted oils, etc. In general, such feedstocks have a metals content of 100 ppm and greater, with the metal content generally being in the order of from about 100 to about 1500 ppm. In accordance with the present invention, there is achieved a significant reduction in metal content, with the metal content of the product being dependent upon the metal content of the feed.

The demetallization of the feedstock may be effected in any one of a wide variety of reactors. Thus, for example, such demetallization may be effected in a fixed bed reactor, a moving bed reactor, a liquid fluidized bed reactor, etc., which may contain one or more beds of coke. The selection of a particular type of demetallization system is deemed to be within the scope of those skilled in the art from the teachings herein.

The feedstock, subsequent to the demetallization procedure may then be further treated by a catalytic process, without fouling of the catalyst by deposition of metals. Thus, for example, the demetallized feedstock may be hydrotreated to effect up-grading thereof to a lower boiling material by procedures known in the art. Alternatively, the feedstock may be hydrodesulfurized by procedures known in the art employing a hydrodesulfurization catalyst. Such procedures form no part of the present invention and, accordingly, no further details in this respect is needed for a complete understanding of the present invention.

In accordance with a preferred embodiment of the present invention, the coke which is employed for effecting the demetallization may be produced by delayed coking at the same site from the feedstock which is to be subjected to the demetallization procedure. In this manner, there is a ready supply of the material which is employed for effecting demetallization of the feedstock.

In accordance with another embodiment of the invention, the coke employed for effecting demetallization of the hydrocarbon feedstock may be subsequently employed as a fuel, whereby metals deposited thereon can be easily recovered as a residue from such combustion. Such metals, mostly vanadium and nickel, have a high salvage value and, accordingly, the present invention provides for easy recovery of such metals. Thus, metals deposited on the coke from the hydrocarbon feedstock, as well as metals present in the coke can be recovered in accordance with the procedure of the present invention. It is to be understood, however, that other procedures for recovering metals from the material employed for demetallization, such as leaching procedures, may also be employed.

The invention will be further described with respect to a preferred embodiment thereof illustrated in the accompanying drawing, wherein:

The drawing is a simplified schematic flow diagram of an embodiment of the present invention.

It is to be understood, however, that the present invention is not to be limited to the embodiment described with respect to the drawing.

Referring to the drawing, a hydrocarbon feedstock, such as a heavy petroleum crude or resid, in line 10 is introduced into a demetallization zone, schematically generally indicated as 11, along with a hydrogen containing gas in line 12. The demetallization zone 11 includes coke, as hereinabove described, and is operated to effect demetallization, as hereinabove described.

Demetallized feedstock is withdrawn from the demetallization zone 11 through line 13 and introduced into a hydrotreating zone, schematically generally indicated as 14, along with hydrogen containing gas in line 15. In accordance with a preferred procedure, the hydrotreating zone 14 is a zone designed and operated to effect upgrading of the hydrocarbon feedstock to lower boiling materials. In particular, such zone is operated at a temperature in the order of from about 650° F. to about 900° F., and a pressure in the order of from about 750 to about 2500 psig. The hydrotreating zone includes a suitable catalyst, such as nickel molybdate on alumina, tungsten nickel sulfide on alumina, or the like. The hydrotreating zone 14 is preferably an ebullated bed type of hydrotreating zone as described in U.S. Pat. No. RE 25,770. As a result of the demetallization effected in zone 11, the catalyst employed in hydrotreating zone 14 remains active for longer periods of time.

Hydrotreated product, including excess hydrogen, hydrogen sulfide and ammonia formed, light hydrocarbons, naphtha and heavier material is withdrawn from hydrotreating zone 14 through line 16.

In accordance with the present invention, periodically, coke containing metals deposited thereon, is withdrawn from demetallization zone 11 through line 17 and introduced into a suitable combustion zone schematically generally indicated as 18, wherein the coke is burned to provide heat to generate steam for the plant. In this manner, metal deposited on the coke, as well as metal originally present in the coke remains as a residue, and such metal can be recovered through line 19. Coke employed in the demetallization zone 11 can be generated in the plant by delayed coking procedures generally known in the art, with the coke production zone schematically generally being indicated as 21. The feed to the coke production zone may be a portion of the feedstock introduced through line 22 and/or a heavy residue recovered as distillation bottoms from the hydrotreating step and introduced through line 23. The coke recovered from the coke production zone 21 after proper sizing may be introduced through line 24 and employed as feed coke to the demetallization zone 11. In this manner, the overall plant is self-sufficient as to demetallization material, and in addition, the metals originally present in the coke and in the hydrocarbon feedstocks are ultimately salvaged.

The invention will be further described with respect to the following example; however, the scope of the invention is not to be limited thereby:

EXAMPLE I

The following green coke is employed to effect demetallization as reported in Table 1.

| GREEN COKE | |
|---|---|
| Properties of Coke: | |
| Bulk Density lbs/cu.ft. | 56.2 |
| Sulfur, wt. % | 0.76 |
| Volatile Matter, wt. % | 6.0 |
| Hydrogen Content, wt. % | 3.65 |
| Metals, ppm | |
| Iron | 6190 |
| Sodium | 90.5 |
| Silicon | 517 |
| Titanium | <39 |
| Nickel | 50 |
| Vanadium | 21.9 |
| Porosity, cc/gm | |
| <100 °A | 0.010 |
| 100–500 °A | 0.000 |
| 500–1000 °A | 0.005 |
| 1000–10,000 °A | 0.009 |

-continued

| GREEN COKE | | |
|---|---|---|
| >10,000 °A | | 0.022 |
| | Total: | 0.046 |
| Average Pore Diameter, °A | | 2067 |
| Surface Area, m²/gm | | 0.9 |

TABLE 1

| Reactor Temperature, °F. | 800 |
|---|---|
| Recactor Pressure, psig | 2060 |
| Coke volume, cc static bed | 100 |
| Coke weight, gms | 90 |
| Coke mesh, U.S. sieve | 12–14 |
| Boscan Feed Rate, cc/hour | 152 |
| Hydrogen Feed Rate, SCFH | 4.2 |
| Vanadium in Heavy Oil Product, ppm | 380 |
| Vanadium in Feed, ppm | 1307 |

EXAMPLE II

After calcination, the green coke of Example 1 has the following characteristics:

| Porosity, cc/gm | |
|---|---|
| <100 °A | 0.000 |
| 100–500 °A | 0.010 |
| 500–1000 °A | 0.000 |
| 1000–10,000 °A | 0.010 |
| >10,000 °A | 0.068 |
| | 0.088 |
| Average Pore Diameter, °A | 1913 |
| Surface Area, m²/gm | 1.8 |

The calcined coke is employed for demetallization as follows:

| Reactor Temperture, °F. | 800 |
|---|---|
| Reactor Pressure, psig | 2000 |
| Coke Volume, cc unexpanded | 100 |
| Coke weight, gms | 85.5 |
| Coke Mesh, U.S. sieve | 12–14 |
| Boscan Feed Rate cc/hour | 87 |
| Hydrogen Feed Rate, SCFH | 4.5 |
| Vanadium in Heavy Oil, ppm | 300 |
| Vanadium in Feed, ppm | 1307 |

Numerous modifications and variations of the present invention are possible in light of the above teachings and, therefore, within the scope of the appended claims, the invention may be practiced otherwise than as particularly described.

We claim:

1. A process for demetallizing a metal-containing hydrocarbon feedstock, comprising:
contacting said metal-containing hydrocarbon feedstock with hydrogen and a material having a porosity of less than 0.3 cc/gram, a surface area of less than 5 m²/gram, an average pore diameter in excess of 1,000 °A. and a pore distribution in which at least 40% of the pores have a size of greater than 10,000 °A., at least 60% of the pores have a size in excess of 1,000 °A., and less than 20% of the pores have a size of less than 100 °A., said contacting being effected at demetallization conditions to deposit metals present in said feedstock on said material.

2. The process of claim 1 wherein the porosity is less than 0.1 cc/gram.

3. The process of claim 2 wherein the surface area is less than 3 meter square per gram.

4. The process of claim 1 wherein the feedstock is selected from the group consisting of heavy petroleum crudes, petroleum residues from atmospheric and vacuum distillations, shale oil and residues thereof, tar sands, bitumen, coal tar pitches and solvent deasphalted oils.

5. The process of claim 1 wherein the feed has a metals content of at least 100 ppm.

6. The process of claim 5 wherein the demetallizing is effected with said material free of added hydrogenating components of Group VI-B and Group VIII metals.

7. The process of claim 6 wherein the demetallization is effected at a temperature of from 500° F. to 1000° F. and a pressure of from 300 to 3000 psig.

8. The process of claim 1 wherein the porosity is less than 0.1 cc/gram, the surface area is less than 2 m²/gm, 50 to 80% of the pores are greater than 10,000 A, 70 to 80% of the pores are of a size greater than 1,000 A and less than 10% of the pores are of a size of less than 100 A.

9. A process for demetallizing a metal containing hydrocarbon feedstock, comprising:
contacting said metal containing hydrocarbon feedstock with hydrogen and a coke selected from the group consisting of calcined coke and green coke, said coke having a porosity of less than 0.3 cc/gram, a surface area of less than 5 m²/gram, an average pore diameter in excess of 1,000 A and a pore distribution in which at least 40% of the pores have a size of greater than 10,000 A, at least 60% of the pores have a size in excess of 1,000 A, and less than 20% of the pores have a size of less than 100 A, said contacting being effected at demetallization conditions to deposit metals present in said feedstock on said coke.

10. The process of claim 9 wherein the coke is a green coke.

11. The process of claim 9 wherein the coke is calcined coke.

12. The process of claim 9 wherein the porosity is less than 0.1 cc/gram.

13. The process of claim 12 wherein the surface area is less than 3 m²/gram.

14. The process of claim 9 wherein the demetallization is effected at a temperature of from 500° F. to 1,000° F. and a pressure of from 300 to 3,000 psig.

15. The process of claim 9 wherein the coke employed in the demetallization is produced by delayed coking of a portion of the feedstock.

16. The process of claim 9 wherein subsequent to the demetallization the coke is employed as a fuel and deposited metal is recovered from the residue.

17. The process of claim 9 wherein the feed has a metals content of at least 100 ppm.

18. The process of claim 17 wherein the feedstock is selected from the group consisting of heavy petroleum crudes, petroleum residues from atmospheric and vacuum distillations, shale oil and residues thereof, tar sands, bitumen, coal tar pitches and solvent deasphalted oils.

19. The process of claim 9 wherein the porosity is less than 0.1 cc/gram, the surface area is less than 2 m²/gram, and the pore distribution is one in which 50 to 80% of the pores are greater than 10,000 A, 70 to 80% of the pores are of a size greater than 1,000 A and less than 10% of the pores are of a size of less than 100 A.

20. The process of claim 19 wherein the demetallizing is effected with coke free of added hydrogenating components of Group VI-B and Group VIII metals.

21. The process of claim 19 wherein the metals content is at least 100 ppm and the demetallization is effected at a temperature of from 500° F. to 1,000° F. and a pressure of from 300 to 3,000 psig.

* * * * *